Oct. 13, 1942.  E. M. ARENTZEN  2,298,448
SELF-LOADING AND SELF-PROPELLED VEHICLE
Filed June 6, 1939  7 Sheets-Sheet 1

INVENTOR.
Einar M. Arentzen.
BY Harold W. Hawkins
ATTORNEY.

Oct. 13, 1942.   E. M. ARENTZEN   2,298,448
SELF-LOADING AND SELF-PROPELLED VEHICLE
Filed June 6, 1939   7 Sheets-Sheet 2

INVENTOR.
Einar M. Arentzen.
BY
Harold W Hawkins
ATTORNEY.

Oct. 13, 1942.  E. M. ARENTZEN  2,298,448
SELF-LOADING AND SELF-PROPELLED VEHICLE
Filed June 6, 1939  7 Sheets-Sheet 5

FIG. 9.

INVENTOR.
Einar M. Arentzen.
BY Harold W. Hawkins
ATTORNEY

Oct. 13, 1942.  E. M. ARENTZEN  2,298,448
SELF-LOADING AND SELF-PROPELLED VEHICLE
Filed June 6, 1939  7 Sheets-Sheet 7

INVENTOR.
Einar M. Arentzen
BY
Harold W. Hawkins
ATTORNEYS.

Patented Oct. 13, 1942

2,298,448

UNITED STATES PATENT OFFICE 2,298,448

SELF-LOADING AND SELF-PROPELLED VEHICLE

Einar M. Arentzen, Franklin, Pa., assignor, by mesne assignments, to Joy Manufacturing Company, Franklin, Pa., a corporation of Pennsylvania Application June 6, 1939, Serial No. 277,627

2 Claims. (Cl. 214—83)

This invention relates to a vehicle or car for transporting material and in particular to a self-propelled vehicle or car which is self-loading and self-unloading.

In general my invention relates to a self-propelled vehicle or car which is capable of and may be used to advantage for loading loose or semi-solid material, and to transport the same to a discharge station where the car is unloaded. It is especially adapted for use in the gathering and loading of coal at the working face in an underground mine worked on the usual room and pillar system; to shuttle back and forth between the working face and the unloading station in the haulage entry to transport the coal so loaded to the haulage entry; and to discharge the coal therein into a suitable receptacle, such as a string of mine cars, or onto a belt or chain conveyor.

The primary object of the present invention is to provide a car or vehicle having a relatively large load carrying compartment and provided with means for gathering material from the floor or surface upon which the car travels and delivering it into the load carrying compartment, and which may be readily driven from place to place to transport the loaded material to a suitable unloading station where the material is readily discharged or unloaded and the load carrying compartment emptied.

Another object of this invention is to provide a self-propelled, self-loading car or vehicle, having an extremely large capacity, for use in the mining of coal and other minerals, which is provided with a pivoted discharge section capable of being swung about a horizontal axis whereby the elevation of the discharge end may be varied at will to permit the car to be unloaded into receptacles of different heights.

A further object is to provide a self-propelled vehicle or car of large load carrying capacity for use in underground mines which is mounted on pneumatic tired wheels so that it can be driven anywhere in the mine without the necessity of laying track, and, while of relatively large size, will readily pass around the corners and other obstructions found in the confined area of a mine.

These and other objects which will hereinafter be made apparent to those skilled in this particular art are accomplished by means of this invention, one embodiment of which is described in the following specification and illustrated in the accompanying drawings, wherein:

Referring to the drawings, 10 represents a large capacity vehicle or car embodying my invention, designed expressly for use in low-roofed underground mines, such as coal mines, for loading coal from the floor of the mine at the working face and conveying it to a discharge station where it is unloaded into a suitable receiving receptacle, such as a string of mine cars or a belt or chain conveyor.

The car 10 comprises a main load carrying or body section 11 having a discharge or auxiliary body section 12 pivotally connected to one end thereof, and a gathering and loading head 13 pivotally connected to the other end which is adapted to gather the material from the floor or surface upon which the car is moving and deliver the same into the car.

The main body section 11 of the car 10 is fabricated or made up of a pair of spaced longitudinally extending angles 15 connected together at the forward end of the body, or the end of the body carrying the gathering head 13, by a channel bar 16, which, together with the angles, forms the main frame of the car. Secured to the top of the angles 15 are upwardly and outwardly sloping plates 17 having outwardly projected flanges 18 at their upper ends, which form the side walls of the car. At the front end of the car, the width of the body section 11 is reduced by the use of plates 19, one on each side, which are secured to the channel bar 16 and extend rearwardly and are bent around and connected at substantially right angles to the forward ends of side walls 17. The side plates 19 also have flange portions 20 which are connected to and form continuations of the flanges 18. The flanges 20 act as cover plates for drive motors of the gathering head hereinafter described. Angles 15 are also connected together by vertically spaced bottom plates 21, 22 which extend longitudinally of the main body section 11 and have their side edges welded to or otherwise connected to the angles 15.

While the forward end of the lower plate 22 extends underneath and is welded to the channel bar 16, the upper plate 21 terminates a short distance from the channel to provide a space between the edge of the plate and the channel 16 for receiving a cross shaft 23. The shaft 23 is journaled in bearings 24, mounted on the outside of the angles 15 and has a pair of sprockets 25 secured thereto in spaced relation for engaging the parallel chains 26 of an endless conveyor of the drag or scraper type having its upper reach traveling over and supported on the plate 21 and its lower reach traveling over and supported on the plate 22. A series of spaced scrapers or flights 27 extend between and have their ends connected to the opposed chains 26 for conveying the material over the top plate 21.

The main body section 11 of the car 10 is supported for movement over the floor of the mine on pneumatic tired driving wheels 30 located at the forward end of the car adjacent the gathering head 13 and pneumatic tired steering wheels 31 located at the rear or discharge end thereof. The front driving wheels 30 are of dual construction and the wheel on each side of the car is mounted on a stub axle 32 which is carried by a bracket 33. The brackets 33 are secured to the angle member 15 on the outside of the car and tend to support and brace the side walls 17.

Each of the forward driving wheels 30 is independently driven, and the drive is effected through a sprocket 34 secured to the hub of each wheel which is connected by a chain 35 through a suitable gear case 36 with a suitable electric motor 37, mounted on the side plate 17 of the car.

Each of the steering wheels 31 is journaled on a T-shaped stub axle 39 which is mounted for turning movement in a bracket 40 secured to the angle member 15 on the outside of the car. One of the axles 39 carries a substantially straight steering knuckle 41 and the other carries a substantially U-shaped knuckle 42, which is connected at its base to the knuckle 41 by a connecting rod 43 so that both wheels turn in the same direction. The wheels 31, 31 are turned or steered by means of a steering rod 44 connected at one end to the U-shaped knuckle 42 and at its other end to a piston (not shown) which operates in a cylinder 45. By admitting fluid pressure alternately to the opposite ends of the cylinder 45 the wheels may be readily turned to guide the car in any direction desired.

The means for controlling the delivery of hydraulic pressure to the opposite ends of the cylinder 45 will be hereinafter described.

The discharge or auxiliary body section 12 is similar in construction to the main body section 11 in that it is provided with two spaced longitudinally extending side walls 50, which are secured at their lower ends to angle members (not shown in detail) connected together throughout their length by transversely extending vertically spaced plates 51, 52 which have their side edge welded to the angle plates. The discharge or auxiliary body section 12 is of somewhat less width than the main body section 11 and the front end is telescoped between the angles 15 and side walls 17 of the main body section 11. The lower forward end of the discharge section is supported for turning movement about a horizontal axis on stub shafts 53 which are also journaled in the side angles 15 of the body section 11. The side plates 50 of the discharge section overlap the side walls 17 of the body section 11 and are provided with elongated slots 54 for receiving bolts 55 extending inwardly from the side walls 17 which limit the angle through which the discharge section 12 may be turned. Nuts 56 are threaded on the ends of bolts 55 to prevent the bolts from being dislodged and the plates 50 from being separated from the plates 17.

In order to turn the rear discharge section 12 about the pivot 53, a bracket 57 is secured to each of the side plates 50, to which is secured one end of a rod 58 having its other end secured to a piston (not shown) operating in a cylinder 59 journaled at its rear end to the side wall 17. By admitting fluid under pressure into the cylinders 59, the rear discharge section of the car may be readily raised and lowered.

From this construction it is apparent that the rear of the discharge section of the car is capable of a limited movement about a horizontal axis relative to the main body section, and that as a result the extreme rear of the car may be raised and lowered to vary the height of the discharge end to permit the car to discharge into material receiving means of various heights.

At the extreme rear end of the car a cross shaft 60 is journaled in the side plates 50 which forms the idler shaft of the endless conveyor and around which the chains 26 carrying the flights 27 are guided by a pair of sprockets 61. The upper reach of the chains 26 passes over the plate 51 and the shaft 60 is arranged to guide the chains around the rear end of the plate 51 and to return them above the plate 52, and in order to form a continuous trough for the passage of material through the car, the forward end of the plate 51 extends underneath the rear end of the plate 21 and the forward end of the plate 52 rides on the top of the bottom plate 22 of the main body section.

The chains 26 are held in position during the raising and lowering of the rear discharge portion 12 of the car by rollers 63 which are mounted on stub shafts 64 carried by the angles 15 of the main body section 11 of the car adjacent the pivot 53 and which engage the tops of the chains 26 and hold them into close proximity with the plates 21 and 51. In order to permit vertical swinging movement of the discharge section 12 about the pivot point 53 without stretching the chains 26, the rear conveyor shaft 60 is provided with a take up mechanism indicated at 65, of usual construction, which permits the shaft 60 to slide in slots (not shown) formed in the side walls 50 and maintain the chains 26 under the desired tension regardless of the angle of vertical adjustment of the discharge section 12.

The gathering and loading head 13 comprises a frame 70 having a substantial V-shaped nose or apron 71 which is adapted to slide over the mine floor and over which coal is moved by a pair of arms 72 traveling in a non-circular orbital path, the movement of the arms being substantially similar to that disclosed in Joy Patent No. 1,306,064 which gather the coal from the mine floor and move it across the apron 71 and deliver the same into position to be engaged by an endless chain scraper conveyor 74 traveling longitudinally in a trough 75. Each of the arms 72 is mounted on a pin 76 carried by a crank arm 77 journaled in the head 70. Each crank arm 77 has a spiral gear 78 connected thereto which meshes with a spiral pinion 79 on a cross drive shaft 80 suitably journaled in the frame of the gathering head. Mounted on the outer ends of the shaft 80 are sprockets 81 connected by sprocket chains 82 with sprockets 83 on the drive shafts of suitable gear reduction units 84, driven by the electric motors 85. The arms 72, which are adapted to clear a path for the advance of the head, are arranged to travel in non-circular orbital paths, which intersect in front of the apron 71, and a slotted link 86, mounted on a pin 87 journaled in the head 70, is attached to the rear end of each arm to impart the desired movement to the arms.

The coal delivered by the arms 72 into the conveyor trough 75 is conveyed upwardly and rearwardly by the scraper conveyor 74, the chains of which are driven from the shaft 80 by sprocket chains 90, which pass around sprockets 91 on the shaft 80 and sprockets 92 on a foot shaft 93 journaled in the head 70 and having driving sprockets 94 thereon engaging the chains of the endless conveyor 74. The rear or tail end of the endless conveyor 74 passes around and is supported by an idler shaft 95 journaled in the frame 70.

Gathering head 13 is mounted for vertically swinging movement relative to the main body section 11 of the car on horizontal pivots 96. In order to raise and lower the head, a pair of single acting hydraulic cylinders or jacks 97 are provided, one on each side of the car, the cylinders of which are pivotally secured at their closed ends to the brackets 98 carried by the frame of the car. Each cylinder or jack 97 has a piston slidable therein pivotally connected by a piston rod 99 with the frame of the head.

The motors 85 are also employed to drive the chains 26 of the endless conveyor extending from the forward end of the main body section 11 to the rear end of the discharge section 12 and for this purpose a sprocket chain 100 is provided, which passes around a sprocket 101 mounted on the drive shaft of one of the gear reduction units 84, and a sprocket 102 secured to a short shaft 103 which is journaled in the frame adjacent the end of the shaft 23. To drive shaft 23 from the shaft 103, which is continuously driven from the motor 85, a clutch is provided, one element 104 of which is rigidly secured to the shaft 23, and the other element 105 is splined for sliding movement on the shaft 103. To move the sliding element 105 of the clutch into and out of engagement with the element 104 on the shaft 23 a double acting hydraulic cylinder or jack 106 is mounted on the clutch casing 107 and has its actuating piston connected by a rod 108 with a pivoted link 109 attached to the sliding collar 110 of the clutch element 105. From this construction it is apparent that when the piston is moved back and forth in the cylinder 106, the clutch element 105 is moved either into or out of engagement with the clutch element 104, depending on the direction of movement of the element 105, and the chains 26 may be driven at will.

Power is delivered to the motors 37, 85 from a suitable source of supply by means of a cable 111 wound on a reel 112 mounted on the side of the discharge portion 12 of the car, and driven in the usual manner by a motor 112a so that when the car is moving in a direction away from the source, cable is played out, and when it is moving in the opposite direction, toward the source, the cable 111 is rewound on the reel 112.

When the car embodying my invention is in operation in the mine, it is driven forward in the mine with the gathering head 13 in its raised position, until it reaches the working face, which has been prepared for loading in the usual manner. As the car approaches the face, the head 13 is then lowered and the car advanced until the head comes in contact with the material or coal to be loaded. The gathering arms 72 may be operating as the car approaches the face, or the arms may be set in motion after the head has been moved into contact with the material to be loaded. The arms 72 gather the coal from the mine floor and deliver it into the trough 75 of the chain and scraper conveyor 74, which is always in operation when the arms are operating and which conveys or delivers the coal into the load carrying compartment of the main body 11, where it piles up adjacent the discharge end of the gathering conveyor 74. The coal piled up adjacent the front end of the car is intermittently moved toward the discharge end of the car by the operator, who operates the clutch to set in motion the chains 26 of the conveyor in the bottom of the car. This operation is repeated until the car is fully loaded. When the car has been fully loaded, the gathering head 13 is again raised and the operator drives the car to the discharge station where he may or may not raise the discharge end of the car 12 in order to clear the receiving receptacle. As soon as the discharge end of the car has been positioned over the receiving end of the receptacle, the operator again engages the clutch elements 104, 105 to set in motion the chains and the scrapers 26, 27 to convey the material in the car into the receiving receptable. When the entire load has been discharged, the clutch is disengaged and the operator again drives the car to the working face where the operation of loading is repeated.

Figure 9:
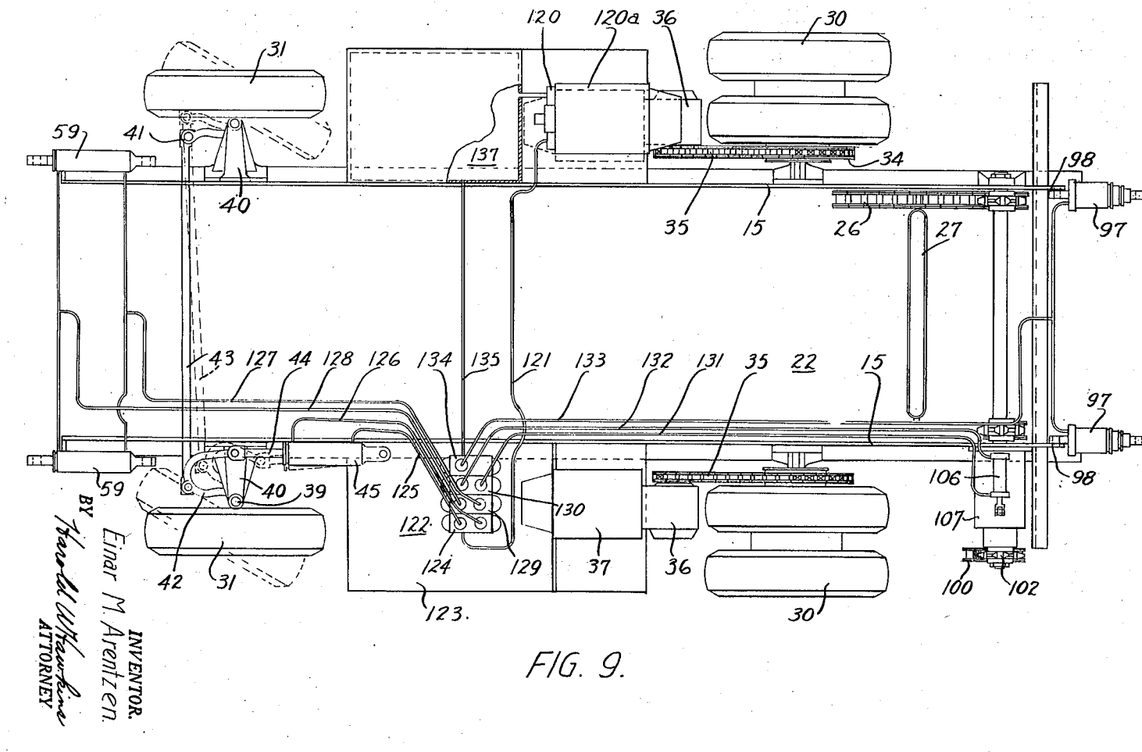
Fig. 9 is an enlarged plan view of the chassis of the car showing the hydraulic system for controlling the various operating parts of the car.
Figure 10:
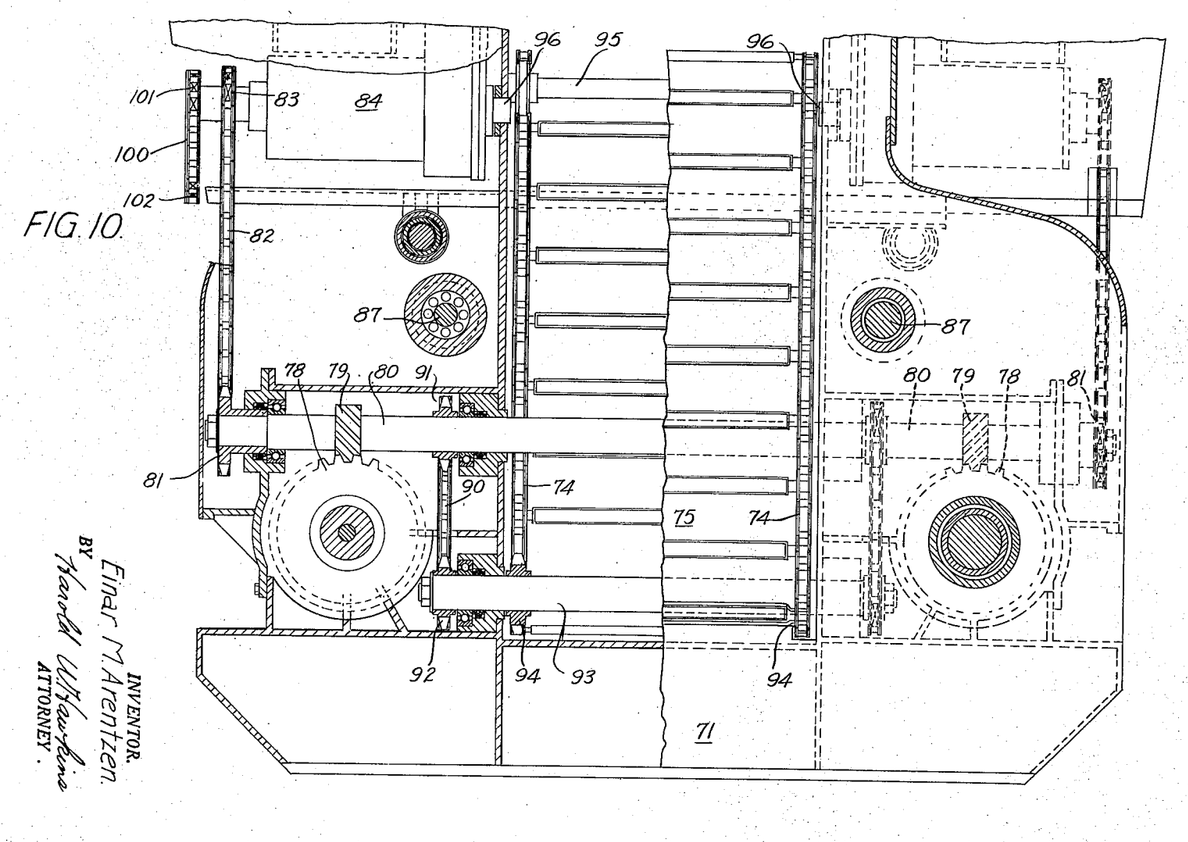
Fig. 10 is an enlarged sectional view of the gathering head illustrating the drive for the gathering arms, the loading conveyor and the main conveyor of the car and having a portion broken away for convenience of illustration.

In Fig. 9 I have shown the hydraulic controls for operating the various mechanisms on my improved car. Mounted above the motor 37 on one side of the car 10 is a hydraulic pump indicated at 120 driven by a suitable electric motor 120a. Leading from the outlet side of the pump 120 is a single line 121 for delivering fluid under pressure to a control box 122, which has a series of valves for controlling the delivery of fluid under pressure to the various hydraulic cylinders or jacks. Control box 122 is located on the side of the car adjacent the operator's platform 123 and has a valve 124 provided with lines 125, 126 leading therefrom to opposite ends of the jack 45 which is of the dual acting type and which controls the steering of the car. When the valve 124 is moved in one direction, fluid is admitted through the line 126 to the cylinder 45 which moves the piston toward the right, as viewed in the drawings, and turns the wheels to the position indicated in the dotted lines. When the valve is moved in the opposite direction, fluid pressure is admitted to the cylinder through the line 125 and the wheels are turned in the opposite direction. The cylinders 59 for controlling the raising and lowering of the rear discharge section of the car are also of the dual acting type and are connected by lines 127, 128 with a valve 129 in the control box 122. By moving the valve 129 in one direction, fluid under pressure passes through line 127 to rear ends of cylinders 59, whereby the rear delivery section is raised, and by moving the valve in the opposite direction fluid pressure passes through line 128 into the opposite ends of cylinders 59 and the rear delivery section is lowered. Valve 130 of the control box 122 controls the operation of the cylinder 107 for engaging the clutch between the shaft 23 and the shaft 103. This cylinder is also of the dual acting type and has lines 131, 132 leading from opposite ends thereof to the control valve. The jacks 97 controlling the raising and lowering of the gathering head 13 are of a single acting type and are connected by a line 133 with a valve 134 in the control box 122. When the valve 134 is actuated in one direction, pressure is admitted to the cylinders 97 and the head 13 is raised. When it is returned to its normal position, the pressure in the cylinder is relieved and the head is lowered by gravity. The fluid returning to the control box 122 from the jacks 45, 59, 97 and 107, is delivered through line 135 into a suitable storage tank 137 located adjacent the pump 120 from which it is drawn and recirculated by the pump 120.

Figure 1:
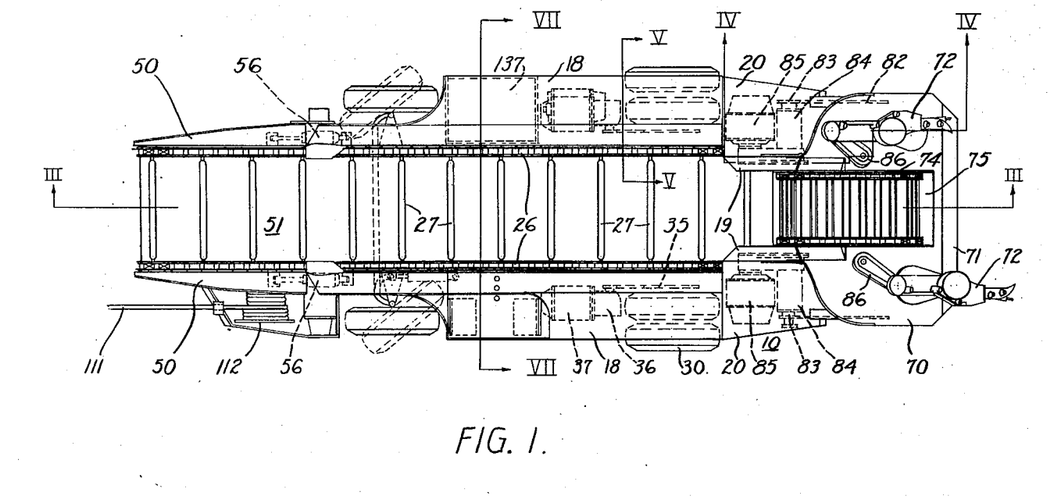
Fig. 1 is a plan view of a self-propelled vehicle or car embodying my invention.
Figure 2:
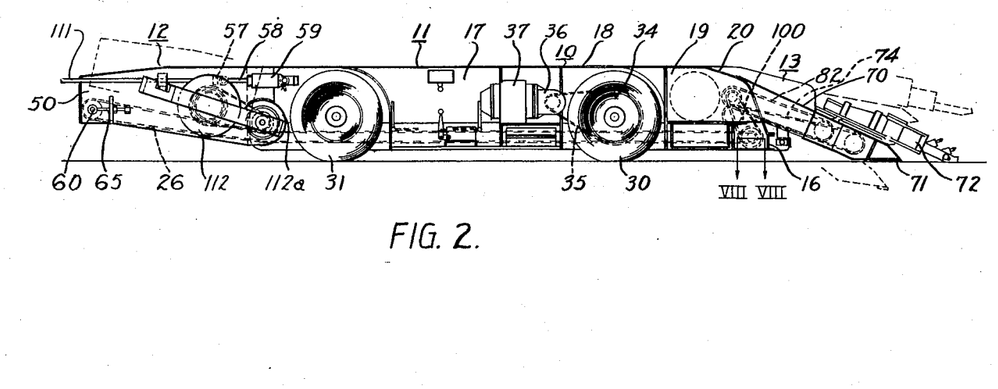
Fig. 2 is a view in side elevation of the car shown in Fig. 1.
Figure 3:
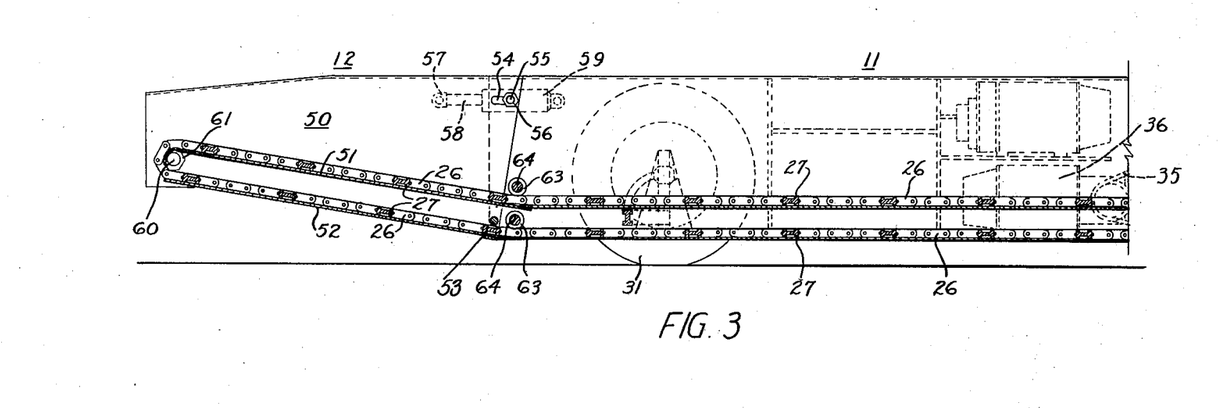
Figs. 3 and 3A are enlarged sectional views taken on the line III—III of Fig. 1.
Figure 3A:
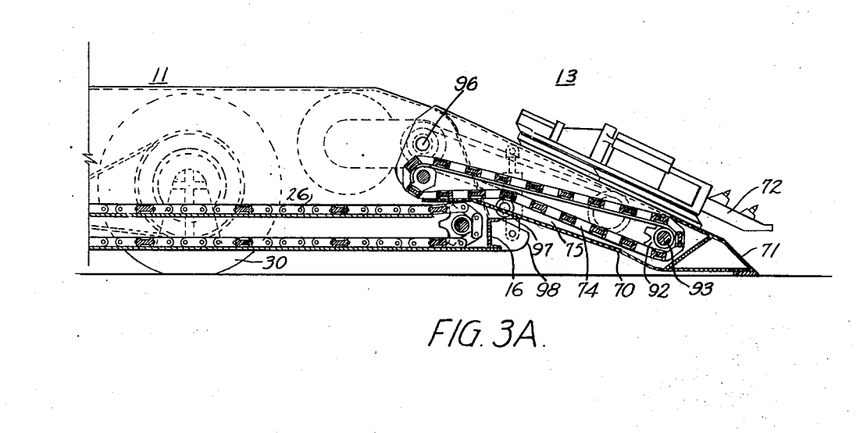
Figures 4, 5, 6:
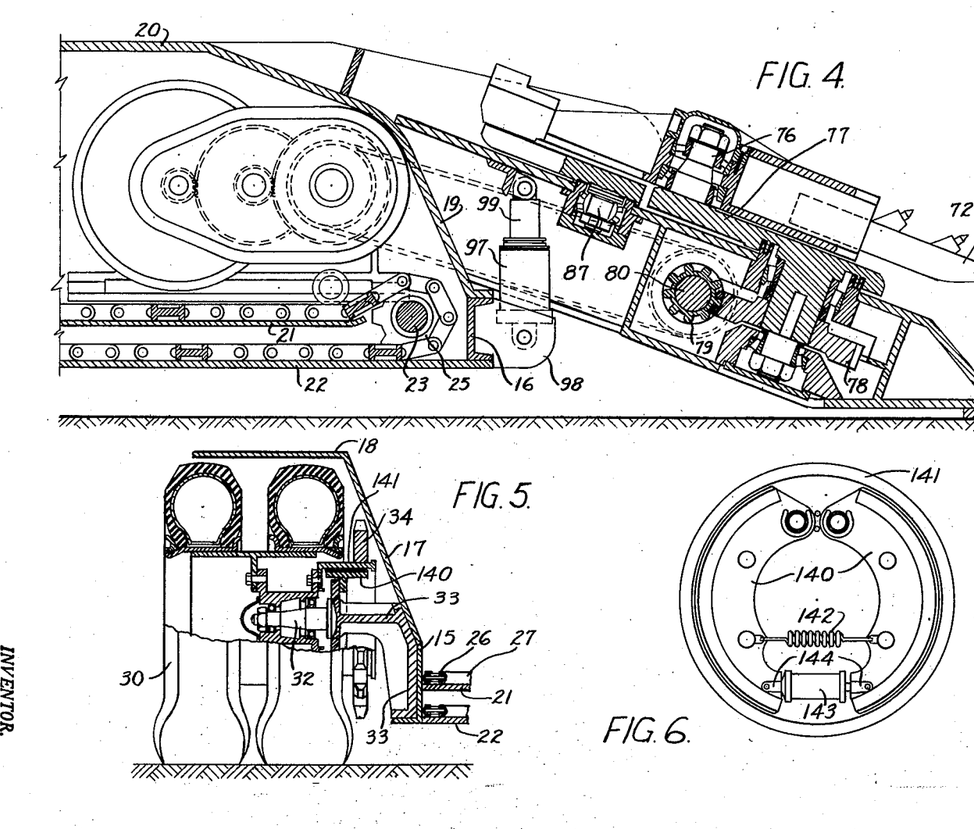
Fig. 4 is an enlarged sectional view of the gathering head taken on the line IV—IV of Fig. 1.
Fig. 5 is an enlarged sectional view taken on the line V—V of Fig. 1.
Fig. 6 is an enlarged detail view illustrating the brake mechanism for the car.
Figure 7:
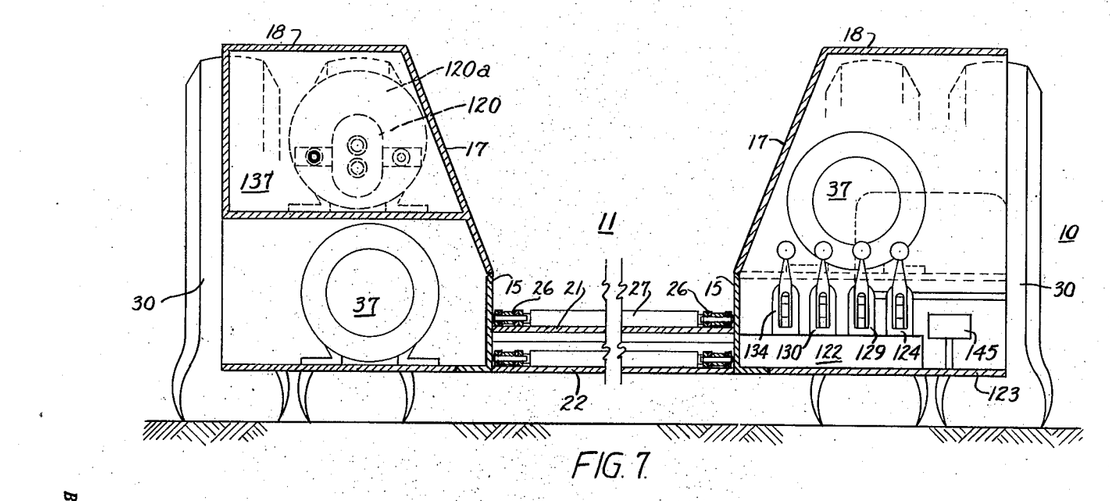
Fig. 7 is an enlarged section taken on the line VII—VII of Fig. 1.
Figure 8:
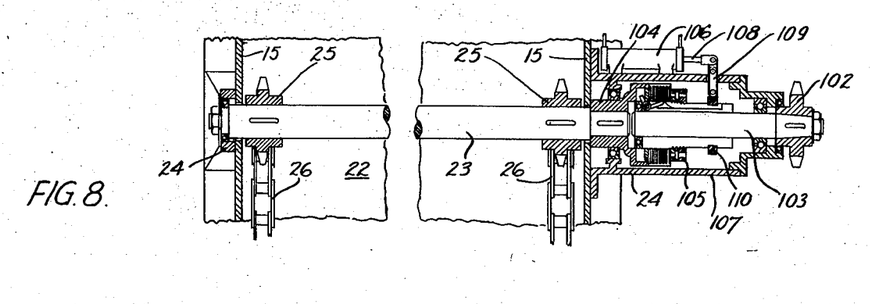
Fig. 8 is an enlarged sectional view taken on the line VIII—VIII of Fig. 2.

While any suitable type of brake may be used on my car, I have shown in Figs. 5 and 6 a hydraulic braking system of the usual type which can be successfully employed. The braking system illustrated comprises a pair of internally expanding brake shoes 140 pivotally mounted on the inside of each of the hubs 141 of the drive wheels 30 and held in their contracted position by a spring 142. To expand the brake shoes 140 and move them into braking relation with the hub, a cylinder 143, having two oppositely movable pistons therein, is mounted between the brake shoes, and the pistons are connected by rods 144 to the shoes 140. As is general practice in this type of brake, the hydraulic system is closed and a plunger (not shown) controlled by the movement of a foot pedal indicated at 145 (Fig. 7) is used to move the piston rods 144 outwardly and move the brake shoes 140 into contact with the hub 141. On release of the foot pedal 145, the spring 142 retracts the brake shoes and returns them to inoperative position.

Figure 11:
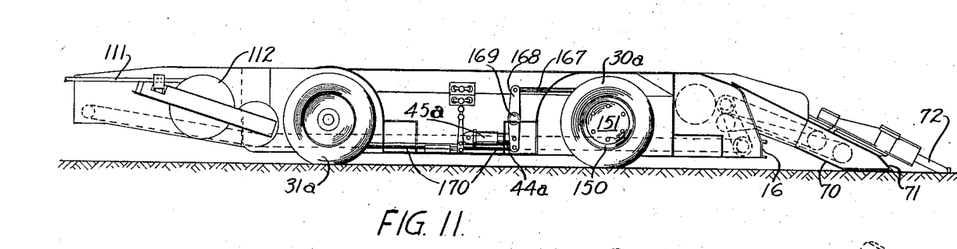
Fig. 11 is a view in side elevation of a car embodying another exemplification of my invention.
Figures 12, 13:
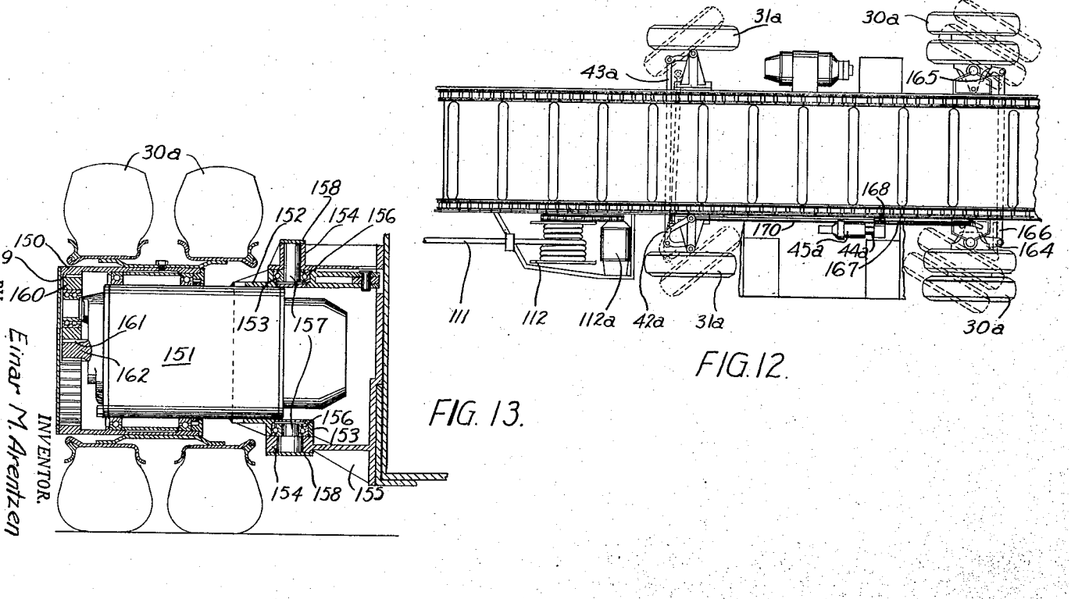
Fig. 12 is a plan view of the car shown in Fig. 11 with the forward end of the car broken away for convenience of illustration.
Fig. 13 is an enlarged sectional view illustrating a modified form of mounting the driving wheels of the car.

In Figs. 11, 12 and 13 I have shown another exemplification of my invention in which the car is provided with 4-wheel steering to facilitate its movement around curves and to permit the car to be used in mines and other places where short turning radii are necessary. In this exemplification, each of the drive wheels 30a of the car is mounted on a cylindrical hub 150 which is journaled on the outer end of the casing of a motor 151, having its inner end secured by welding to an annular member 152, which surrounds the inner end of the motor. The annular member 152 is also provided with oppositely disposed pin and bearing receiving sockets 153, which register with opposed pin receiving sockets 154 formed in a bracket 155 which is secured to the side of the car. In assembling the wheels on the car, the annular member 152 with the bearings 156 in place in the sockets 153 is slipped into the bracket 155 until the sockets 153 register with the sockets 154, at which time pins 157 are inserted into such registering sockets. Pins 157 are held in position by cover plates 158 removably secured to the sockets 154.

The wheels 30a are driven by the motors 151 through a suitable planetary train of gears comprising an internal gear 159, carried by each of the cylindrical members 150, which meshes with three intermediate gears 160 driven by a pinion 161 on the motor shaft 162.

In order to steer the driving wheels 30a as well as the wheels 31a, one of the annular members 152 is provided with an L-shaped extension 164 and the other is provided with an extension 165 equal in length and parallel to one of the legs of the extension 164 to which it is attached by a tie rod 166. The other leg of the L-shaped extension 164 is connected to one end of a rod 167 having its opposite end connected to the upper end of a vertically extending lever 168 pivoted at 169 to the side of the car. The end of the lever 168 below the pivot 169 is connected to the end of a rod 170, which has its opposite end connected to the steering knuckle 42a for the wheels 31a, which are connected together by the tie rod 43a.

From this construction it is apparent that when the lever 168 is turned to the right as shown in Fig. 11, the wheels 30a, 31a will be turned to the position shown in dotted lines in Fig. 12, and when the lever is turned to the left, the wheels will be turned in the opposite direction, and since all wheels are turned the car can be made to negotiate relatively sharp curves.

In order to turn the lever 168, a hydraulic jack 45a of the dual or double acting type is secured to the side of the car and a rod 44a connects the piston (not shown) in the cylinder with the lever 168. Motive fluid is introduced into the cylinder or jack 45a and the operation of the cylinder or jack is controlled in the manner heretofore described in connection with the jack 45, which, when all wheels are to be driven, is replaced by the jack 45a, as heretofore set forth.

While I have described a self-propelled material transporting vehicle made in accordance with my invention, it is apparent to those skilled in this particular art that certain modifications, substitutions, additions or omissions may be made therein without departing from the spirit of my invention or the scope of the appended claims.

What I claim as new and desire to secure Letters Patent is:

1. A mine shuttle car comprising a wheeled body having outwardly sloping sidewalls and a substantially flat floor, an auxiliary body pivoted to said first mentioned body below the floor thereof and having side walls and a floor forming a continuation of the side walls and floor thereof, a conveyor operating over the floors of said body and auxiliary body for moving material from one end of said car to the other, mechanisms attached to the side walls of said body and auxiliary body respectively for raising and lowering said auxiliary body to vary the elevation of the discharge end thereof, and means for maintaining said conveyor in operable position at all elevations of said auxilary body.

2. A shuttle car comprising a wheeled load carrying body having a floor and sidewalls projecting upwardly from said floor, supporting wheels for said body, an open ended auxiliary load carrying body pivotally connected to the end of said main body and forming the discharge end of said car, the pivotal connection between said bodies being below the floors thereof, a gathering and loading mechanism pivoted to the other end of said main body, means for raising and lowering said gathering mechanism, means for raising and lowering said auxiliary body, an endless conveyor extending across the floors of said main body and auxiliary body, and means for driving said traction members to transport said car between a loading position and a discharge position.

EINAR M. ARENTZEN.